P. E. CHAPMAN.
ARMATURE AND COIL WINDING MACHINE.
APPLICATION FILED FEB. 23, 1918.
1,351,230. Patented Aug. 31, 1920.
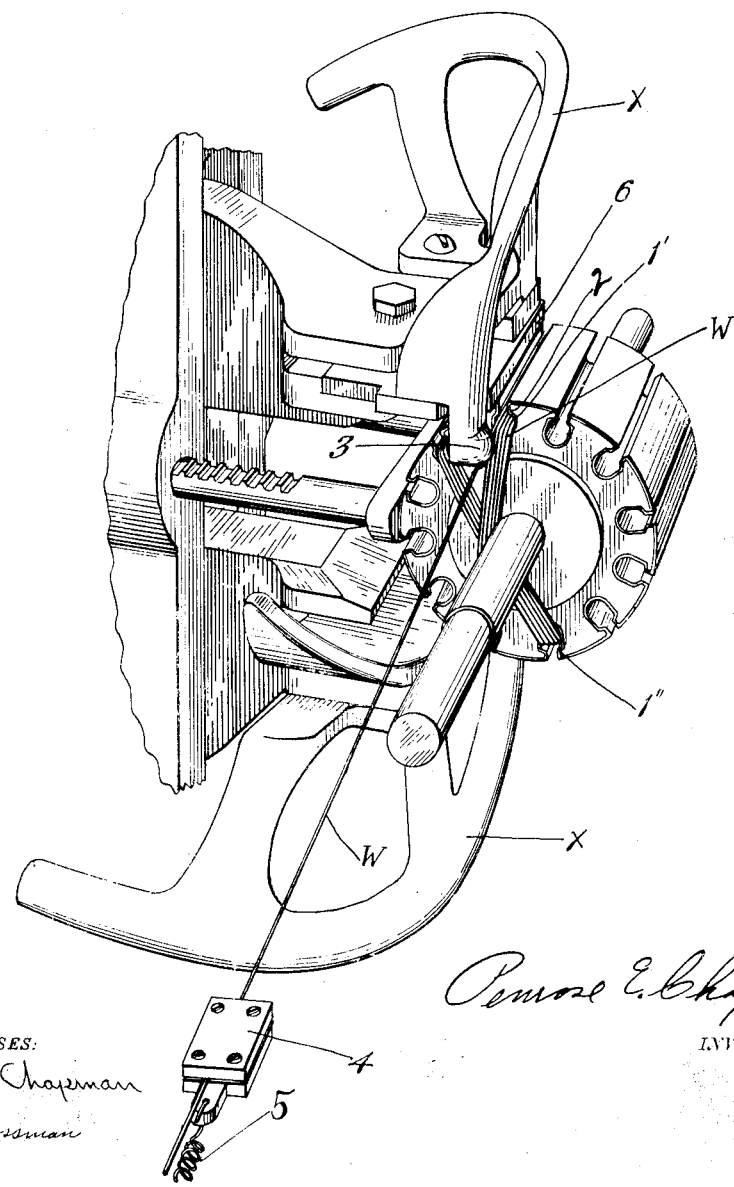

UNITED STATES PATENT OFFICE.

PENROSE E. CHAPMAN, OF ST. LOUIS, MISSOURI.

ARMATURE AND COIL WINDING MACHINE.

1,351,230.  Specification of Letters Patent.  Patented Aug. 31, 1920.

Application filed February 23, 1918. Serial No. 218,785.

*To all whom it may concern:*

Be it known that I, PENROSE E. CHAPMAN, a citizen of the United States, residing at St. Louis, State of Missouri, have invented a certain new and useful Improvement in Armature and Coil Winding Machines, of which the following is a full, clear, and exact description, such as will enable others skilled in the art to which it appertains to make and use the same, reference being had to the accompanying drawings, forming part of this specification.

The object of my invention is the production of level and smooth or layer windings in armature coils, both when wound directly on the armature or when wound on a form, and in the production of layer windings in general, automatically with a mechanism of great simplicity and speed. As a matter of convenience and because it is a difficult application, the device will be described in connection with the inventor's armature winding machine disclosed in Patent #1,121,798, December 22, 1914, and in application #877,167 dated December 14, 1914. The machines disclosed in the said patent and application and all other allied devices until this invention are only adapted to put random or non layer windings in a slot (automatically) which windings also tend to fill up in the slot diagonally *i. e.*, not "level" or square with the slot.

I accomplish these objects by the mechanism shown.

The drawing discloses a diagrammatic view of this invention wherein a slotted armature 1 is shown in connection with the wing X and jaw 6 of my armature winding machine hereinbefore referred to much of the balance being cut away.

In all previous machines the winding wire W slides off of such wire directing guides as may be provided, falling in the slot at random "beds" at any place that it may slip or slide to, thus producing a rather irregular or "random" winding which takes more space than a layer winding, the surface frequently piling up somewhat diagonally which is only desirable with the smaller sizes of wire.

To produce level and layer windings in straight sided coils (*i. e.*, coils with a "land") such as the usual armature coils (either wound on the core or other object), it is necessary that the coil forming wire as it approaches the straight portion of the previous turn, be "offset" *i. e.*, moved away from the said turn, then pulled against it as it comes to rest on a "land" of the coil. In this document the term "offset" will be taken to include the actions just described, and the term "land" to include both the "land" of a coil (or jig) and the landing or coming to a seat of the wire, as the two actions occur simultaneously and not separately.

In the case shown, I accomplish these results by attaching to the wire directing guide or wing X which guides the wire in to the slots 1', 1'', etc., an offset cam 3 which offsets or deflects the wire W in passing over it (as shown in the drawing, to the right) out and under the overhanging tooth 2 of the armature core 1 releasing it in time for the tension on the wire to pull it back (tc the left) across the floor of the slot into position against the side of the slot or a previously laid turn. Each successive turn will thus be deposited along side of the previously laid one, building up a level coil which in certain cases will be in smooth layers.

The device will in addition to this automatically start a new layer when the preceding one is full, for then there is nothing to hinder the wire sliding across the finished layer and repeating the operation, it will automatically change the number of turns in a layer as the width of the slot changes whether the change is an irregular one as at a curved bottom, or simply due to tapering sides. W' shows some of the wire as laid "level" and in layers by the device.

For the best results a tension device with a take up should be applied to the wire W as diagrammatically shown at 4 and 5.

The sharp curve at the top of the cam 3 as shown is of course due to the necessity for clearing the overhanging portion of the tooth 2, if the slot is straight sided as in a jig, this curve may be so much easier as to almost conceal said offsetting cam, the appearance may then be more as of an extension to some convenient portion of the mechanism.

While my invention has a wide application in winding layer coils, particularly those with a straight side or lay it is being described only in connection with winding semi closed slot armatures to avoid confusion, and the term "wire" will be taken to include any elongated material.

Having now described my invention I wish to

Claim:

1. In a winding device, means for producing windings of the character described consisting of the combination of means for winding "wire" with means for "offsetting" said wire as it comes to a "land" on a straight side in the coil being wound.

2. In a winding device, means for producing windings of the character described consisting of the combination of means for winding "wire," means for "offsetting" said wire as it comes to a "land" on a straight side with means for applying a tension to said wire.

3. In a winding device, means for producing windings of the character described consisting of the combination of means for winding "wire" with an "offsetting" cam for offsetting said wire as it comes to a "land" on a straight side in the coil being wound.

4. In a winding device, means for producing windings of the character described consisting of the combination of means for winding wire, wire directing guides and an "offsetting" cam for offsetting the wire as it comes to a "land" on a straight side in the coil being wound.

5. In a winding device, means for producing windings of the character described consisting of the combination of means for winding wire, directing guides, an "offsetting" cam for offsetting said wire at lands on straight sides in the coil being wound with means for applying a tension to said wire.

6. In an armature winding device, means for producing windings of the character described consisting of the combination of means for guiding the wire in to the slots of an armature, with means for offsetting said wire after it enters the slots in said armature.

7. In an armature winding device, means for producing windings of the character described consisting of the combination of means for guiding the wire in to the slots of an armature with an offsetting cam arranged to offset the wire after it enters the slots in said armature.

8. In an armature winding device, means for producing windings of the character described consisting of the combination of means for guiding the wire in to the slots of an armature, an offsetting cam for offsetting the wire after it enters the slots in said armature and means for applying a tension to said wire.

9. In an armature winding device, means for producing windings of the character described, consisting of the combination of means for holding an armature in position to be wound with an offsetting cam for offsetting the wire after it enters the slots in said armature.

In testimony whereof I have hereunto affixed my signature, in the presence of two witnesses, this 20th day of Feb., 1918.

PENROSE E. CHAPMAN.

Witnesses:
H. R. EGGERS,
J. E. KOSSMAN.